United States Patent Office 3,515,096
Patented June 2, 1970

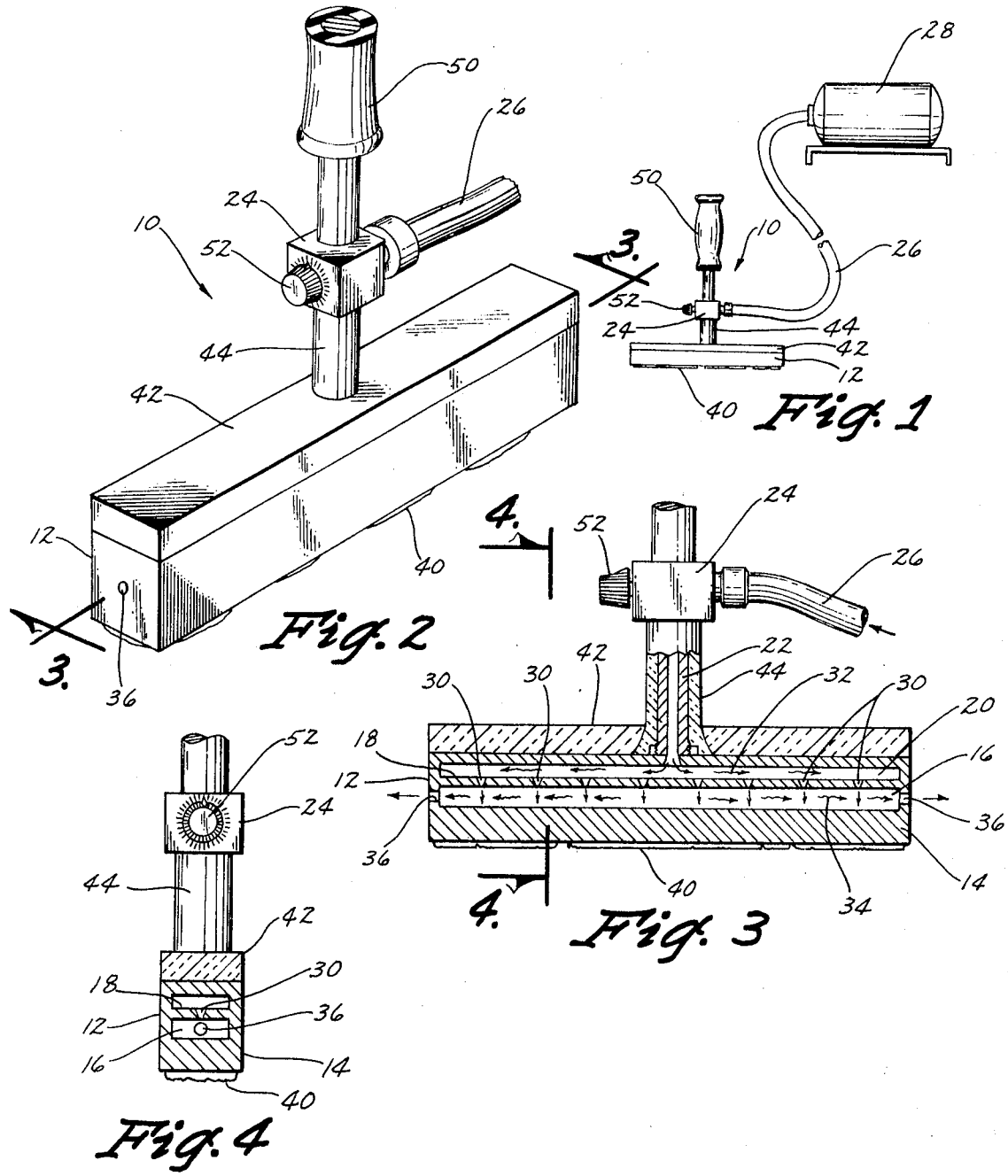

3,515,096
FREEZE-BRANDING DEVICE
Alex Hogg, Coin, Iowa 51636
Filed Mar. 18, 1968, Ser. No. 713,578
Int. Cl. A01k *11/00*
U.S. Cl. 119—1      4 Claims

ABSTRACT OF THE DISCLOSURE

The device and method for branding animals using circulated super cooled air to cool a branding iron which is applied to the skin of the animals. The freezing destroys the pigment producing cells without destroying the hair or skin and new hair is white in color.

---

The branding of animals heretofore has been accomplished by the burning or partially burning of the hair and skin on an animal thereby leaving a permanent mark or label of identification to show ownership. This is a cumbersome procedure requiring heated branding irons and is painful to the animals. The hair cells are killed and the hide usually is unusable.

This invention avoids these problems by making it possible to distinctively brand the animal without the use of heat and without killing any hair cells. The method is less painful and does not damage the hide. Moreover the brand on the animal is distinctive because the new hair that grows in is white in color. It is only the pigment cells that are destroyed.

The branding device is connected to a source of freezing liquid air and because the air is continuously circulated over the branding iron sole portion the temperature of the sole portion is maintained as desired either at a constant temperature or at a higher or lower temperature as desired.

It is noted that conventional hot branding iron is first heated and then cools off and is then reheated. It is difficult to maintain a constant temperature on a hot branding iron.

These and other features and advantages of this invention will become readily apparent to those skilled in the art upon reference to the following description when taken into consideration with the accompanying drawings, wherein:

FIG. 1 is a reduced in scale perspective view of the branding iron connected to a liquid air supply source;

FIG. 2 is an enlarged perspective view of the branding iron;

FIG. 3 is a cross-sectional view taken along line 3—3 in FIG. 2; and

FIG. 4 is a cross-sectional view taken along line 4—4 in FIG. 3.

The branding iron of this invention is generally referred to in FIG. 2 by the reference numeral 10 and includes a body portion 12 having a sole plate 14 forming one wall of a cooling compartment 16. The opposite wall 18 of the chamber 16 forms the bottom wall of a chamber 20 which is in communication with a conduit 22 connected to a metering valve 24 which in turn is connected through a conduit 26 to a vacuum insulated Dewar tank 28.

It is seen that the cooling chamber 16 is fed liquid air through the series of evenly distributed openings 30 such that a uniform temperature is obtained on the sole plate 14. The wall 18 distributes the air in the chamber 20 as indicated by the arrows 32 along the full length of the compartment 20 for passage into the cooling chamber 16. The air as indicated by the arrows 34 then passes out outlet openings 36 at opposite ends of the chamber 16.

The outer surface of the sole plate 14 is provided with an appropriate brand mold face 40. The top of the body 12 is covered with styrofoam insulation material 42. The conduit 22 extends through a support pipe 44 fixedly secured to the top surface of the body 12. The conduit 22 is then threadably secured to the support pipe 44.

The support pipe 44 extends beyond the valve 24 and is provided with a vertically disposed handle 50. A manual rotatable valve control 52 is positioned on the valve 24 for metering the flow of air through the conduit 22 to the compartment 20 and the chamber 16.

Thus it is seen in operation that the source of liquid air 28 is cooled to the appropriate temperature on the order of minus 318 degrees Fahrenheit. The air is permitted to circulate through the branding device 10 by opening the valve 24 through use of the manual control 52 on the handle 50. Very shortly the temperature of the sole plate 14 will be brought up to the temperature of the liquid air and then the branding operation may begin. Because the sole plate 14 is formed of copper or copper alloy material and is relatively thick it will hold its temperature sufficiently long enough for the branding operation to be completed. It is apparent that if the flow of air is reduced the temperature of the sole plate 14 will be also raised. Through experimentation, the exact temperature and length of time required to apply the iron to the skin will be determined. The super cooled branding device 10 will be maintained in contact with the skin only sufficiently long enough to kill the pigment producing cells and thus preserve the hair cells whereby hair subsequently will grow and be white in color thus providing a distinctive branding mark.

I claim:

1. A freeze branding iron, comprising,
    an elongated body member being substantially rectangular in shape and having a top portion, bottom portion, side portions and opposite ends,
    said body member having first and second co-extensive elongated rectangularly-shaped compartments, with said first compartment being adjacent said top portion and said second compartment being adjacent said bottom portion,
    a wall in said body member separating said compartments, said wall having a plurality of uniformly spaced orifice openings therein,
    the bottom portion of said body member comprising a sole plate and having a branding indicia thereon,
    a discharge orifice opening in said body member at the opposite ends of said second compartment,
    a rigid conduit extending outwardly from the center of the top portion of said body member, and being in communication with the interior of said first compartment, said conduit being in communication with a source of super-cooled liquid gas,
    said compartments being completely free from obstructions along their lengths to permit the super-cooled gas to freely flow therethrough, and
    a valve means in said conduit to selectively control the flow of super-cooled gas from the source of gas into said body member.

2. The device of claim 1 wherein said conduit terminates in a rigid handle element, and said conduit is connected to said source of super-cooled liquid through a flexible conduit extending away from said valve.

3. The device of claim 1 wherein said pole plate is comprised of metal and is of a thickness substantially greater than the top portion of said body member whereby said sole plate can better maintain a substantially reduced temperature upon being exposed to said super-cooled liquid gas in said second chamber.

4. The device of claim 1 wherein an insulation material is mounted over the upper portion of body member, and around said conduit between said body member and said valve means.

References Cited

UNITED STATES PATENTS

| | | | |
|---|---|---|---|
| 3,190,081 | 6/1965 | Pytryga | 62—293 |
| 3,270,744 | 9/1966 | Katz et al. | 128—303.1 |
| 3,272,203 | 9/1966 | Chato | 128—303.1 |
| 3,358,648 | 12/1967 | Berens | 119—1 |
| 3,362,381 | 1/1968 | Farrell | 119—1 |
| 3,411,483 | 11/1968 | Canoy | 119—1 |

ALDRICH F. MEDBERY, Primary Examiner

U.S. Cl. X.R.

158—14